United States Patent [19]

Spitz et al.

[11] 3,920,716

[45] Nov. 18, 1975

[54] LIQUID PHASE METHANOL GASIFICATION

[75] Inventors: Peter H. Spitz, Hartsdale; Marshall E. Frank, Chappaqua, both of N.Y.

[73] Assignee: Chem Systems, New York, N.Y.

[22] Filed: Mar. 29, 1974

[21] Appl. No.: 456,067

[52] U.S. Cl. .......... 260/449 M; 48/197 R; 252/373; 260/449 R; 260/449.6
[51] Int. Cl.² ........................................ C07C 27/06
[58] Field of Search ............... 48/197 R; 252/373; 260/449 R, 449 M, 449.6

[56] References Cited
FOREIGN PATENTS OR APPLICATIONS
640,809  5/1962  Canada ........................... 48/449 M Primary Examiner—S. Leon Bashore
Assistant Examiner—George C. Yeung
Attorney, Agent, or Firm—Bert J. Lewen

[57] ABSTRACT

Methanol is converted into methane by passing a stream of methanol through a suspension of a catalyst in an inert fluidizing medium, such as mineral oil. The methane, carbon dioxide, and water reaction products, essentially free of carbon monoxide are removed from the fluidized medium and processed to purify the methane. The inert fluidizing medium containing dissolved water formed in the reaction is recirculated with external cooling to dissipate the heat from the overall reaction.

6 Claims, 1 Drawing Figure

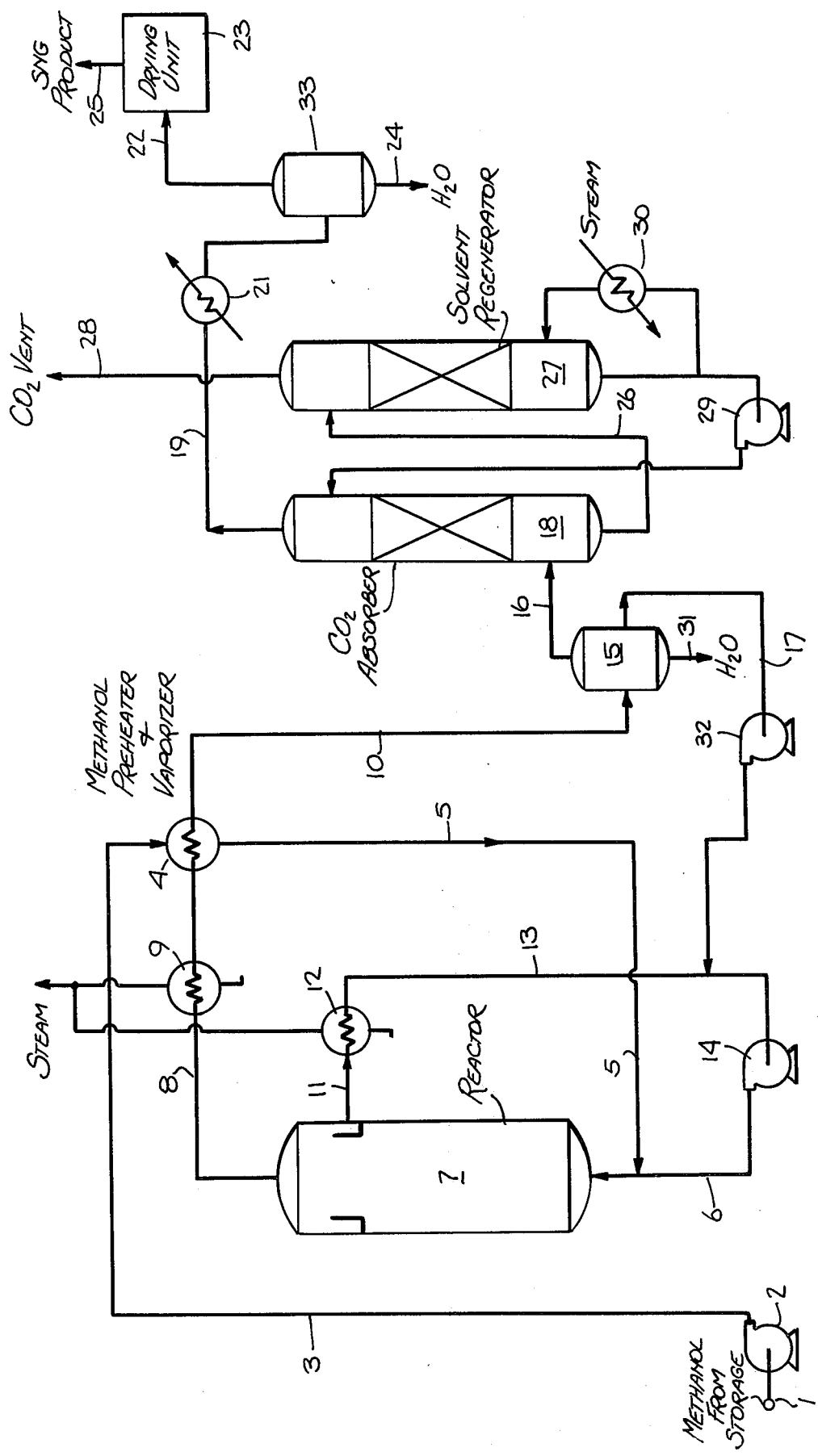

LIQUID PHASE METHANOL GASIFICATION

DESCRIPTION OF THE INVENTION

This invention relates to a new and improved process for producing methane from methanol. More specifically, the invention teaches a methanation process wherein all of the reactions for the conversion of methanol to methane take place in a fluidizing medium containing suspended catalyst particles.

As the shortage of petroleum products intensifies, the need for obtaining natural gases from other than natural sources continually increases. One source of such natural gas is methanol, a liquid under normal conditions, which can be shipped without danger and can be formed by the reaction of carbon monoxide and hydrogen. Such reactions are well known and described in the literature (see U.S. Pat. No. 3,326,956). The overall reaction for conversion of methanol to methane is as follows:
$$4CH_3OH \rightarrow 3CH_4 + CO_2 + 2H_2O$$
Actually, this overall reaction is the end result of several reactions. Initially, upon the application of heat and over the proper catalytic surface, methanol vapors are completely dissociated into hydrogen and carbon monoxide according to the following reaction:
$$CH_3OH \rightleftarrows 2H_2 + CO$$
Thereafter, the hydrogen and carbon monoxide react simultaneously according to the methanation reaction and the water-gas shift reaction as follows:
$$CO + 3H_2 \rightleftarrows CH_4 + H_2O$$
$$CO + H_2O \rightleftarrows H_2 + CO_2$$
These reactions, both highly exothermic, proceed to equilibrium and the composition of the final mixture is such that the equilibria of both reactions are satisfied at reaction exit temperature and pressure. Temperature control is key in methanol gasification for both catalyst life and for achieving a favorable equilibrium.

Presently, there are no commercial plants for gasifying methanol to form substitute natural gas (SNG).

Any methanol gasification process must produce a substitute natural gas that is interchangeable with present pipeline natural gas. The ideal and most economical case would be to use but a single reaction stage. In such case, upon subsequent removal of carbon dioxide and water, the product gas would meet SNG specifications. These latter by-products are easily removed, while residual hydrogen and carbon monoxide can be removed only by reaction to methane.

The generally accepted specification for CO is 0.1% maximum in the final SNG product. There is no specific $H_2$ concentration limitation, but specifications on heating value, Wobbe number and Weaver flame speed index will generally set the maximum hydrogen concentration. Usually a $H_2$ concentration of 0.5 to 3.0% in the SNG product is acceptable.

The residual amounts of hydrogen and carbon monoxide in the reaction product is determined by the equilibrium of the system. Since this is only a function of temperature, pressure and the initial concentration of carbon, hydrogen and oxygen in the feed, it is possible to accurately calculate the conditions of temerature and pressure that are required to meet the CO specification of the product SNG.

None of the process routes being contemplated today for methanol gasification can achieve this CO specification in a single reaction stage. Therefore, in such processes, an additional reaction stage is included to methanate the residual CO with hydrogen. This methanation reactor is the same as those used in SNG plants using LPG or naphtha feedstocks. The methanation reactions are:
$$CO + 3H_2 \rightleftarrows CH_4 + H_2O$$
$$CO_2 + 4H_2 \rightleftarrows CH_4 + 2H_2O$$
There are two methods of methanating the effluent gases from the first reaction stage. In the first, the "wet" method, the first stage reactor effluent gases are passed to the methanation reactor without condensing out the water produced in the gasification reactor. The water adversely affects the thermodynamic equilibrium level of the methanation reaction limiting the maximum temperature at which complete conversion of carbon monoxide can be achieved to approximately 370°C. This temperature is affected somewhat by the reaction pressure.

In the second method, the "dry" methanation system, the bulk of the water is condensed and removed by cooling the first stage reactor effluent. The gases must then be reheated to the methanation reactor inlet temperature. This cooling and reheating obviously wastes heat. However, in this method the maximum temperature limitation for achieving complete carbon monoxide conversion is increased substantially since the water is not present. In fact, in the dry system, thermodynamics do not set the maximum operating temperature, but rather the physical integrity of the methanation catalyst. The maximum temperature is usually about 480°C.

Regardless of which methanation system is employed, wet or dry, it is preferred to conduct this second stage reaction in a vapor phase fixed bed reactor on a "once-through" basis, allowing the heat of reaction to be absorbed by an adiabatic temperature rise of the gases passing through the reactor. This adiabatic temperature rise is approximately 50°C. for every one volume percent of carbon monoxide reacted. Commercial nickel-containing methanation catalysts usually require temperatures of 250° to 300°C. to initiate the reaction. Therefore, the maximum temperature rise across a wet methanator and a dry methanator for complete carbon monoxide conversion are substantially different. The wet methanator can have an adiabatic temperature rise of approximately 70° to 120°C. This then limits the carbon monoxide inlet concentration to a maximum value of 1.6 to 2.0 vol %. The dry methanator can have an adiabatic temperature rise of approximately 180° to 230°C. This means that a dry methanator can accept a feed gas richer in carbon monoxide; e.g., 4.0 vol. %. This allows more slippage of carbon monoxide from the first stage reactor effluent. Despite this however, the wet methanator is usually preferred over the dry methanator since it uses a smaller reactor; does not require heat exchangers for cooling the first stage reactor gas, condensing the water and reheating the gas; and results in better overall process steam economy. Even so the inclusion of a wet methanation reactor poses economic penalties on any methanol gasification process. If this second stage could be eliminated or substantially reduced from that required in known processes, significant economic advantages would result.

The process steps following the methanation reaction are straightforward. Generally, the product gases are first cooled to condense both the water formed in the reaction and the steam initially added. Carbon dioxide is then removed by scrubbing the gas with a suitable absorbant. Finally, the product gas is dried to meet the necessary specifications for substitute natural gas.

Methanol gasification processes must provide a reliable means of reactor temperature control to insure catalyst integrity and activity and for thermodynamic considerations. Another equally important consideration is to prevent carbon formation in the reactor, via the Bouduard reaction:

$$2CO \rightleftarrows C + CO_2$$

The Bouduard reaction is generally suppressed by co-feeding steam with the methanol into the gasification reactor.

Several processing schemes have been proposed in the prior art for controlling reactor temperature. These attempt to accommodate, within certain limits, the high exothermic heat of reaction of methanol in gasification. These processing schemes are: multi-stage gasification with either interstage cooling or quench cooling; recycle of cooled reaction products back to the inlet to limit the adiabatic temperature rise; single stage tubular reactor with shell side heat removal. They each have particular disadvantages. For example, the multi-stage concept still requires process steam addition and a complicated reactor design even when part of the liquid methanol feed is used for direct contact cooling.

There are two different modes for the reactor effluent recycle process. Cooling the recycle stream and condensing out most of the water is the conventional means. However, the rejection of low level heat in cooling the recycle stream reduces the ultimate efficiency. Recycling hot wet product gas has been proposed to avoid this loss in process efficiency. This variation, however, depends on the use of rotating machines under severe temperature conditions.

The tubular reactor is a complex and ultimately expensive reaction system and process steam is still required.

In accordance with this invention, it has now been found that the aforesaid disadvantages can be overcome and that the methanation can take place in a single reactor which is of a simple design and configuration. These advantages are achieved by introducing methanol into a liquid phase system containing a catalyst slurry. The liquid phase is an inert material which facilitates the contact of the gaseous methanol with the catalyst and serves as a "heat sink", that is, a medium which can absorb large amounts of heat and thereby avoid substantial temperature rises.

The hot inert liquid may be removed from the reactor and, after cooling, recycled. Such operation is unexpectedly advantageous because it eliminates the need for an external steam generator. Because steam is generated as a by-product and because the inert liquid dissolves at least some of such steam, adequate steam injection occurs merely by cooling and recycling the water bearing inert liquid. It is quite surprising that in the gasification process of the invention the reaction can be initiated without the introduction of steam. In most all other gaseous processes, as described above, the addition of steam from an external source is needed to avoid carbon formation. The hot gas recycle process, the one process which does not require external steam addition, is dependent upon the use of rotating machinery under severe operating conditions to provide the steam at the inlet to the gasification reactor.

Still another unexpected advantage of the process is the high reactivity of the methanol in the liquid phase. While the exact reason for this is not known, it may be postulated that the dissolved methanol and water promote a reforming reaction as in the case of steam-methane or steam-naphtha reforming. By having the methanol and water together in the liquid phase at the catalyst surfaces, the advantages of high reactivity, an advantage normally associated with reforming, is achieved.

Not only does the aforesaid operation eliminate the need for a recycle compressor, steam injection, and complex reactor designs, but it also makes the process safer, since the inert liquid avoids the possibility of excessive temperature runaway during the process caused by, for example, the loss of circulating pump capacity. Additionally, the single step reaction is very simple and yields very close to pure methane.

The attached FIGURE is a flow sheet showing the formation of methane from methanol in accordance with the teaching of the invention. A plant for the production of 3,350,000 normal cubic meters per day of SNG is depicted.

Liquid methanol from storage via line 1 is pumped by pump 2 to operating pressure and sent via line 3 to preheater and vaporizer 4. The feed rate is 263,605 Kg/hr. The vaporized methanol passes via line 5 to the reactor 7 along with 5,680,100 Kg/hr of the cooled recirculated inert liquid containing 131,800 Kg/hr of water via line 6. The reactor 7 is a simple vessel containing a highly active nickel-based catalyst that promotes both the methanol dissociation reaction and the subsequent simultaneous methanation reaction. The catalyst particles are held in a fluidized state by the circulation of the inert liquid. As the methanol vapors progress up the reactor, they are gasified into synthesis gas which, in turn, is almost simultaneously converted into methane. The inert liquid both fluidizes the catalyst particles (thereby increasing available gas-solid contact) and acts as a heat sink for absorbing the heat of the reactions. The overall reaction is highly exothermic, with a heat release of 17.5 Kcal per gm-mole of methanol converted to methane. Surprisingly, by using the circulating inert liquid, the reaction is carried out at close to isothermal conditions.

The product gases leave the reactor 7 via line 8. They consist of 98,286 Kg/hr of methane, 92,009 Kg/hr of carbon dioxide, 72,816 Kg/hr of water, 316 Kg/hr of hydrogen and 176 Kg/hr of carbon monoxide. The exit velocity is controlled to prevent the entrainment of catalyst particles. The circulating liquid is removed from the top of the reactor via line 11, also without entraining any catalyst. It is cooled in heat exchanger 12 by generating high pressure steam and then recycled to the bottom of the reactor via line 13 and recirculating pump 14 and line 6. In the overall process 226,980 Kg/hr of steam are produced.

The product gases leaving the reactor via line 8 are first cooled by generating steam in heat exchanger 9 and then by preheating and vaporizing the fresh methanol feed in heat exchanger 4. After this initial cooling, the product gases are fed via line 10 to vapor-liquid separator 15. The water (64,570 Kg/hr) is purged from the bottom of the vapor-liquid separator 15 via line 31 and may be used as make-up for the steam generation units. A small part of the inert liquid in the reactor may also be vaporized and leaves with the effluent gas. This portion of the inert liquid is condensed along with the water upon cooling and is phase separated from the water in the vapor-liquid separator 15 and recycled back to the reactor 7 via line 17 and recycle pump 32.

The vapor effluent from the vapor-liquid separator 15 now containing only 8246 Kg/hr of water is sent via line 16 to a carbon dioxide absorber 18 where it is contacted with a suitable solvent, such as aqueous potassium carbonate, for absorbing the carbon dioxide. Sufficient carbon dioxide is removed from the gas to meet substitute natural gas specifications. Other well known chemical and physical means of removing carbon dioxide may be used. The rich solvent leaves the bottom of the carbon dioxide absorber 18 via line 26 and is passed to the solvent regenerator 27. The carbon dioxide (91,450 Kg/hr) is removed from the solvent regenerator 27 by venting via line 28. The regenerated solvent leaves the bottom of solvent regenerator 27 and is recirculated via pump 29 for reuse in the carbon dioxide absorber 18. Heat is provided to the solvent regenerator 27 by the reboiler 30.

The wet synthetic natural gas containing 98,286 Kg/hr of methane, 8246 Kg/hr of water, 178 Kg/hr of carbon monoxide, 316 Kg/hr of hydrogen and 559 Kg/hr of carbon dioxide leaves the top of the carbon dioxide absorber 18 via line 19 is cooled in heat exchanger 21. The additional water condensed is separated from the gas in the vapor-liquid separator 33. Residual water (8000 Kg/hr) is removed via line 24 and the substitute natural gas passed to the drying unit 23. This drying unit may be a standard package glycol type. The substitute natural gas product containing 98,286 Kg/hr of methane, 178 Kg/hr of carbon monoxide, 559 Kg/hr of carbon dioxide and 316 Kg/hr of hydrogen meeting the necessary specification is removed from the process via line 25.

The aforesaid process flow sheet serves to exemplify the invention. It will be readily understood by those skilled in the art that many variations in the product purification scheme can be made without departing from the essential part of the invention. Also, if desired, the catalyst particles, along with the inert liquid, may be passed through the heat exchanger and recycled.

Other advantages of the instant invention is that the relatively low velocities of the liquid fluidized bed serve to avoid attrition of the catalyst, since the catalyst is cushioned by the fluidizing medium.

The conditions of the reaction must be selected to insure essentially complete conversion of the methanol fed to the reactor and the elimination of the carbon monoxide in the reactor effluent. To obtain the advantages of the invention, the carbon monoxide must be reduced to less than 1.7%. The following reaction parameters will serve to guide those skilled in the art to select the optimum conditions.

The space velocity, defined as volume of methanol vapor (0°C., 1 atm.) per hour divided by volume of catalyst may range from 500 to 10,000 normal cubic meters/cubic meter reactor-hours. Preferably from 1,000 to 3,000 NCM/CM reactor-hours. The temperature may range from 225° to 500°C., preferably, though from 250° to 425°C. The operating pressure is entirely flexible and may range from 5 atmospheres to 100 atmospheres, preferably from 25 to 60 atm., depending upon the desired pressure of the SNG product.

In addition to the nickel type methanation catalyst shown in the example, other known methanation catalysts such as ruthenium and other noble metals on heterogeneous supports may be selected. Any chemically inert support having a low attrition may be used. Examples of these are kieselguhr, alumina, silica-alumina, zirconia, silicon carbide and carbon. The catalyst may be in the form of an extrudate or a tablet from 10 mm. to 0.15 mm. in a spherical or granular form.

The inert liquid fluidizing medium preferentially is a hydrocarbon that is chemically stable and liquid under the reaction conditions. Preferably it is sulfur-free (especially if the catalyst is poisoned by sulfur). Examples of suitable fluidizing media are mineral oils such as Penndrake code 4417 and Sun 21 (a trademark of Sun Oil Company); paraffinic compounds having a boiling range of from 200°C. to 500°C.; desulfurized gas oils; and aromatic high boiling liquids such as the $C_9$ to $C_{12}$ fraction that is obtained from naphtha refining for gasoline production. In order to eliminate the need for introducing steam into the reaction from external sources, the inert liquid must be capable of dissolving at least a small amount of the water of reaction at reaction conditions as for example, at least 0.1 to 10.0% by weight, more preferably from 0.2 to 5.0 wt.%.

The velocity of the liquid fluidizing medium is dependent on the physical characteristics of the catalyst. For example, if a 10 mm. catalyst is used, the velocity should be from 120 to 360 $M^3$/hrs-$M^2$. For the finer catalysts, such as the 0.15 mm. type, from 5 to 25 $M^3$/hrs-$M^2$ is sufficient. As a general rule, the liquid flow should be sufficient to expand the bed by at least 5% as compared to its settled state. The maximum expandible height is flexible and will be limited by the point where there is no longer any sharp definition of bed height.

Additionally, the liquid circulating flow should be sufficient to provide a feed to the reactor having a water to methanol ratio of from 0.05:1 to 1:1 by weight, more preferably from 0.1:1 to 0.7:1.

While in practicing the instant invention, there is no requirement for a second stage of reaction, it may be desirable from an overall economic point of view, to add a small methanation stage, if cost optimization studies show that it is advantageous to leave a small amount of carbon monoxide remaining in the effluent gas. The reaction of the residual carbon monoxide may be completed in a simple wet methanation system. The heat generated can be easily controlled at carbon monoxide concentrations significantly less than 1.7%. Generally, when economic studies show that the use of a finishing reactor is desirable, the carbon monoxide concentration of the reactor effluent is maintained from 0.2 to 1.0%, preferably, from 0.4 to 0.6%. This finishing reactor would require less catalyst than in the conventional wet methanation system and operate at lower temperatures.

EXAMPLE 1

To demonstrate the effect of process variables on the process of the subject invention, a bench scale unit was used. A 25 mm. outside diameter by 1200 mm. reactor was loaded with 72.4 grams of a commercial nickel-based catalyst used in commercial methanation processes. To form the catalyst 5 × 2 mm. tablets were crushed and screened to give particles in the range of 0.8–1.0 mm. mesh size. The catalyst has a bulk density of 0.80–0.88 gm/cc.; and contains 58 wt.% of nickel.

The feed contained 99.8 wt.% of methanol. The inert liquid circulated through the reactor was a paraffinic mineral oil with an average molecular weight of 240 and a viscosity at 40°C. of 5 cps. (trade name WITCO 40). Three sets of runs were made to determine the effect of contact time on the methanol conversion and the selectivity to methane. The results are shown in Table I. Chromatographic analyses of the reactor effluent gas are shown on a dry basis. Table I also shows the molar selectivities to carbon products, (carbon monoxide, carbon dioxide, methane, ethane, and propane). In this example the reaction temperature and reaction pressure were held constant at 330°C. and 35 atmospheres, respectively.

Increased pressure does not require any associated gas compression costs and actually reduces the overall costs since it aids the subsequent processing step where carbon dioxide is removed from the product methane by an absorptive process. Increased pressure operation may also be advantageous since energy can be recov-

TABLE I

| Run No. | VHSV* | Temp °C. | Pres. atms. | MeOH Conv. | % Molar Selectivity | | | | | Effluent Concentration, Dry Basis | | | | | |
|---|---|---|---|---|---|---|---|---|---|---|---|---|---|---|---|
| | | | | | CO | $CH_4$ | $C_2H_6$ | $C_3H_8$ | $CO_2$ | CO | $CH_4$ | $C_2H_6$ | $C_3H_8$ | $CO_2$ | $H_2$ |
| 1A | 1950 | 330 | 35 | 81.8 | 20.1 | 62.0 | 0.63 | 0.07 | 17.1 | 15.9 | 49.0 | 0.31 | 0.02 | 13.5 | 20.7 |
| 1B | 880 | 330 | 35 | 95.5 | 4.47 | 70.2 | 0.59 | 0.07 | 24.6 | 3.81 | 59.9 | 0.25 | 0.02 | 21.0 | 15.0 |
| 1C | 520 | 330 | 35 | 100 | NIL | 73.23 | 0.55 | 0.07 | 26.15 | <0.05 | 69.6 | 0.20 | 0.02 | 25.18 | 5.0 |

*Normal cubic meters per hour of methanol (as vapor at 0°C. and 1 atmosphere) per cubic meter of catalyst.

In Run 1C when the space velocity was reduced to 520 reciprocal hours, complete conversion of the methanol was obtained and the product gases contained essentially nil carbon monoxide.

EXAMPLE 2

In the same bench scale unit as described in Example 1 another series of runs was performed with the same quantity of catalyst and using 99.8 wt.% methanol feed. These runs were made to determine the effect of reaction temperature on methanol conversion and methane selectivity. All other conditions were maintained constant. The results are shown in the following table:

ered by letting the product gas expand through a power recovery turbine prior to its delivery at the plant's battery limits.

Catalysts such as employed in the above examples have operated at temperatures up to 475°C. in vapor phase operations. The true upper limitation in the process is the stability of the inert liquid. Of the hydrocarbon liquids which can be utilized this is probably 375°–400°C. When the liquid decomposes it would generally be by hydrocracking which would generate light hydrocarbons which would end up in the product SNG and actually be beneficial in raising the heating value of the product gas. The decomposition of the

TABLE II

| Run No. | VHSV* | Temp °C. | Pres. atms. | MeOH Conv. | % Molar Selectivity | | | | | Effluent Concentration, Dry Basis | | | | | |
|---|---|---|---|---|---|---|---|---|---|---|---|---|---|---|---|
| | | | | | CO | $CH_4$ | $C_2H_6$ | $C_3H_8$ | $CO_2$ | CO | $CH_4$ | $C_2H_6$ | $C_3H_8$ | $CO_2$ | $H_2$ |
| 2A | 1980 | 330 | 35 | 78.6 | 22.7 | 59.3 | 1.94 | 0.19 | 15.9 | 18.0 | 47.1 | 0.77 | 0.05 | 12.6 | 21.4 |
| 2B | 1980 | 360 | 35 | 96.2 | 10.0 | 65.0 | 0.45 | 0.04 | 24.4 | 8.06 | 52.2 | 0.18 | 0.01 | 19.6 | 19.8 |
| 2C | 1980 | 380 | 35 | 100 | Nil | 72.32 | 0.35 | 0.03 | 27.3 | <0.05 | 68.28 | 0.15 | 0.01 | 25.76 | 5.8 |

*Normal cubic meters per hour of methanol (as vapor at 0°C. and 1 atmosphere) per cubic meter of catalyst.

In Run 2C where the temperature was increased to 380°C. complete conversion of methanol occurred and the resulting product gas contained essentially no carbon monoxide.

EXAMPLE 3

In the same bench scale unit as described in Example 1, another series of runs was performed with the same quantity and type of catalyst, using 99.8 wt.% methanol as feed. These runs were made to determine the effect of reaction pressure on methanol conversion and methane selectivity. All other conditions were maintained constant. The results are shown in the following table:

inert liquid, therefore is detrimental only with regard to the effects on the material balance and methanol utilization, and does not affect the operability or product specifications. The upper limit of 375°–400°C. is also quite compatible with the thermodynamic limitations for achieving specification product in a single stage reaction system.

EXAMPLE 4

In the same bench scale unit as described in Example 1 another run was performed with the same quantity of catalyst and using 99.8 wt.% methanol feed. Table IV shows the results obtained. In this run complete conversion of methanol was obtained. The product gases

TABLE III

| Run No. | VHSV* | Temp °C. | Pres. atms. | MeOH Conv. | % Molar Selectivity | | | | | Effluent Concentration, Dry Basis | | | | | |
|---|---|---|---|---|---|---|---|---|---|---|---|---|---|---|---|
| | | | | | CO | $CH_4$ | $C_2H_6$ | $C_3H_8$ | $CO_2$ | CO | $CH_4$ | $C_2H_6$ | $C_3H_8$ | $CO_2$ | $H_2$ |
| 3A | 2080 | 330 | 35 | 69.7 | 27.1 | 57.5 | 2.00 | 0.08 | 13.2 | 20.9 | 44.3 | 0.77 | 0.02 | 10.2 | 23.7 |
| 3B | 2015 | 330 | 48 | 83.8 | 16.5 | 63.4 | 1.53 | 0.07 | 18.5 | 13.6 | 52.3 | 0.63 | 0.02 | 15.3 | 18.1 |
| 3C | 2050 | 330 | 69 | 100 | Nil | 74.0 | 1.24 | 0.06 | 24.7 | <0.05 | 73.0 | 0.58 | 0.02 | 23.65 | 4.8 |

*Normal cubic meters per hour of methanol (at vapor at 0°C. and 1 atmosphere) per cubic meter of catalyst.

In Run 3C, the operating pressure was increased to 69 atmospheres and complete methanol conversion was obtained. The product gases from this run showed essentially no carbon monoxide.

from the reactor showed 0.51 vol.% carbon monoxide. This small quantity of carbon monoxide is easily reacted completely with the remaining hydrogen in a secondary finishing reactor. The gases flow directly to this finishing reactor without cooling and condensing out the water of reaction.

TABLE IV

| VHSV | Temp °C. | Pres. Atm. | MeOH Conv. | % Molar Selectivity ||||| Effluent Conc. ||||||
|---|---|---|---|---|---|---|---|---|---|---|---|---|---|---|
| | | | | CO | CH$_4$ | C$_2$H$_6$ | C$_3$H$_8$ | CO$_2$ | CO | CH$_4$ | C$_2$H$_6$ | C$_3$H$_8$ | CO$_2$ | H$_2$ |
| 2030 | 340 | 57 | 100 | 0.55 | 73.7 | 1.23 | .07 | 24.45 | 0.51 | 69.7 | .58 | 0.02 | 23.5 | 5.69 |

We claim:

1. A process for the conversion of methanol to methane which comprises: passing methanol into a reaction zone containing a suspension of a methanation catalyst in an insert fluidizing medium; upwardly flowing said fluidizing medium in said reaction zone so as to expand the volume of catalyst by at least 5% at a temperature of from 225° to 500° C., said fluidizing medium being in the liquid phase and capable of dissolving from 0.1 to 10 wt.% of water under the reaction conditions; converting substantially all of the methanol feed to the reaction zone; removing from said reaction zone a gaseous product containing methane and having less than 1.7 mole % (on a dry basis) of carbon monoxide.

2. The process of claim 1 wherein the space velocity in said reaction zone is from 500 to 10,000 normal cubic meters of methanol vapor per hour per cubic meter of catalyst.

3. The process of claim 1 wherein said catalyst is a nickel or a nickel-promoted catalyst.

4. The process of claim 1 wherein a portion of the upwardly flowing fluidizing medium is withdrawn from the top of the reaction zone at a relatively elevated temperature, cooled and recycled to the bottom of the reaction zone, and wherein the recycled fluidizing medium contains dissolved therein water formed in the reaction, such water being present in an amount sufficient to provide a water-to-methanol ratio in the feed to the reactor of from about 0.05:1 to 1:1 by weight.

5. The process of claim 1 wherein the fluidizing medium is a $C_9$ to $C_{12}$ aromatic hydrocarbon.

6. The process of claim 1 wherein the fluidizing medium is a desulfurized gas oil which is in the liquid phase under the reaction conditions.

* * * * *